(12) United States Patent
Ko et al.

(10) Patent No.: US 10,903,957 B2
(45) Date of Patent: Jan. 26, 2021

(54) METHOD FOR TRANSCEIVING BROADCAST CHANNEL SIGNALS IN A WIRELESS COMMUNICATION SYSTEM AND APPARATUS THEREOF

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/064,990

(22) PCT Filed: May 26, 2017

(86) PCT No.: PCT/KR2017/005543
§ 371 (c)(1),
(2) Date: Aug. 28, 2018

(87) PCT Pub. No.: WO2018/030617
PCT Pub. Date: Feb. 15, 2018

(65) Prior Publication Data
US 2019/0173628 A1 Jun. 6, 2019

Related U.S. Application Data

(60) Provisional application No. 62/372,816, filed on Aug. 10, 2016, provisional application No. 62/418,180, filed on Nov. 6, 2016.

(51) Int. Cl.
*H04J 4/00* (2006.01)
*H04L 5/00* (2006.01)
(Continued)

(52) U.S. Cl.
CPC ............. *H04L 5/005* (2013.01); *H04J 3/00* (2013.01); *H04J 4/00* (2013.01); *H04J 11/00* (2013.01);
(Continued)

(58) Field of Classification Search
CPC .. H04N 21/2389; H04N 21/242; H04Q 1/245; H04J 3/00; H04J 4/00; H04J 11/00
See application file for complete search history.

(56) References Cited

U.S. PATENT DOCUMENTS

2007/0008936 A1* 1/2007 Toshimitsu .......... H04B 7/2615
370/337
2014/0204851 A1 7/2014 Chen et al.
(Continued)

FOREIGN PATENT DOCUMENTS

| JP | 2016-507954 A | 3/2016 |
|---|---|---|
| JP | 2016-512405 A | 4/2016 |
| WO | 2015080649 A1 | 6/2015 |

OTHER PUBLICATIONS

R1-165364, "Support for Beam Based Common Control Plane", May 23-27, 2016, pp. 1-5 (Year: 2016).*
(Continued)

*Primary Examiner* — Salvador E Rivas
(74) *Attorney, Agent, or Firm* — Dentons US LLP

(57) ABSTRACT

A method for a transmission-side device to transmit a signal in a wireless communication system is disclosed. To this end, the transmission-side device forms a multiplexed block by multiplexing a primary synchronization signal (PSS), a secondary synchronization signal (SSS) and a physical broadcast channel (PBCH) signal in time and frequency domains, wherein the PSS and the SSS form a synchronization signal (SS) by being multiplexed by the time-division multiplexing (TDM) method, and the SS and PBCH signals
(Continued)

(a) TDM with SS (Same BW)   (b) TDM with SS (Different BW)   (c) FDM with SS form the multiplexed block by being multiplexed by the TDM or frequency-division multiplexing (FDM) method.

7 Claims, 15 Drawing Sheets

(51) Int. Cl.
| | |
|---|---|
| *H04J 3/00* | (2006.01) |
| *H04J 11/00* | (2006.01) |
| *H04L 27/22* | (2006.01) |
| *H04W 8/00* | (2009.01) |
| *H04W 48/16* | (2009.01) |
| *H04W 56/00* | (2009.01) |
| *H04W 72/04* | (2009.01) |

(52) U.S. Cl.
CPC ............... *H04L 5/00* (2013.01); *H04L 5/0094* (2013.01); *H04L 27/22* (2013.01); *H04W 8/005* (2013.01); *H04W 48/16* (2013.01); *H04W 56/001* (2013.01); *H04W 72/0453* (2013.01); *H04L 5/0007* (2013.01)

(56) References Cited

U.S. PATENT DOCUMENTS

| | | | |
|---|---|---|---|
| 2014/0293913 A1* | 10/2014 | Yen | ........................ H04L 5/0073 370/329 |
| 2015/0023331 A1 | 1/2015 | You et al. | |
| 2015/0049741 A1 | 2/2015 | Chen et al. | |
| 2015/0223210 A1 | 8/2015 | Guo et al. | |
| 2016/0277225 A1* | 9/2016 | Frenne | .................. H04L 27/261 |
| 2016/0337817 A1* | 11/2016 | Malladi | .................... H04W 4/06 |
| 2018/0279388 A1* | 9/2018 | Miao | ...................... H04W 72/04 |

OTHER PUBLICATIONS

Nokia, Alcatel-Lucent Shanghai Bell, "Support for Beam Based Common Control Plane," 3GPP TSG-RAN WG1 #85, May 23-27, 2016, R1-165364.

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0 (Sep. 29, 2009).

Ericsson: "NB-IoT—DL Design", R1-157419, XP051040113, 3GPP TSG RAN WG1 Meeting #83, Anaheim, California, USA, Nov. 15-22, 2015.

* cited by examiner

FIG. 7

(a) 8 APs  (b) 4 APs (c) 2 APs  (d) 1 APs

FIG. 9

(a) 8 APs (b) 4 APs

(c) 2 APs    (d) 1 APs

FIG. 13

(a) 8 APs (b) 4 APs

FIG. 14

(c) 2 APs (d) 1 APs

METHOD FOR TRANSCEIVING BROADCAST CHANNEL SIGNALS IN A WIRELESS COMMUNICATION SYSTEM AND APPARATUS THEREOF

This application is a National Stage Application of International Application No. PCT/KR2017/005543, filed on May 26, 2017, which claims the benefit of U.S. Provisional Application No. 62/372,816, filed on Aug. 10, 2016 and U.S. Provisional Application No. 62/418,180, filed on Nov. 6, 2016, all of which are hereby incorporated by reference in their entirety for all purposes as if fully set forth herein.

TECHNICAL FIELD

Following description relates to a method of transmitting and receiving a broadcast channel signal in 5G wireless communication system and an apparatus therefor.

BACKGROUND ART

Recently, standardization for a mobile communication technology is arriving at the study on 5G mobile communication after passing through 4G mobile communication technologies such as LTE and LTE-A. In 3GPP, the 5G mobile communication is referred to as NR (new radio).

According to current NR system design requirements, it is able to see that there are considerably divergent requirements. For example, a frequency band used by the NR ranges from 700 MHz to 70 GHz, a system bandwidth ranges from 5 MHz to 1 GHz, moving velocity has a range ranging from 0 km/h to 500 km/h, and environment for the NR includes indoor, outdoor, a large cell, and the like. In particular, the NR requires supporting in various situations.

In the various requirements existing situation, the most common design direction is to design a system in consideration of a poorest situation among the various situations.

DISCLOSURE OF THE INVENTION

Technical Task

However, if a signal is transmitted with a single pattern under the assumption of the extreme circumstances, it is very inefficient in terms of resource efficiency. This problem is identically applied to a transmission of a PBCH (physical broadcast channel) signal which is used for transmitting essential system information.

In order for a user equipment (UE) to initially access a cell, it is necessary for the UE to acquire a synchronization signal (SS) for obtaining synchronization and a cell ID and the aforementioned PBCH signal for transmitting essential system information. It is required to have a method of efficiently transmitting and receiving the signals under the various environment of the NR system.

Technical Solution

To achieve these and other advantages and in accordance with the purpose of the present invention, as embodied and broadly described, according to one embodiment, a method of transmitting a signal, which is transmitted by a transmitting side device in a wireless communication system, includes configuring a multiplexed block by multiplexing a PSS (primary synchronization signal), an SSS (secondary synchronization signal), and a PBCH (physical broadcast channel) signal in time frequency domain, wherein the multiplexed block is configured by performing a TDM (time division multiplexing) scheme on the PSS, the SSS, and the PBCH signal, and transmitting the multiplexed block to a receiving side device.

The PBCH signal is transmitted via a resource of 12 RBs (resource blocks) and an RE (resource element) for transmitting 2 DMRSs can be allocated according to an RB in which the PBCH signal is transmitted.

It is preferable that the PSS and the SSS have the same bandwidth.

The PBCH signal can be multiplexed with the SS using the TDM scheme. If the PBCH signal and the SS have the same bandwidth, the PBCH signal can be transmitted via a plurality of OFDM symbols.

The PBCH signal can be multiplexed with the SS using the TDM scheme. In this case, the PBCH signal can be transmitted via a bandwidth wider than a bandwidth of the SS through 1 OFDM symbol.

On the contrary, the PBCH signal can be multiplexed with the SS using a FDM scheme. In this case, the PBCH signal can be transmitted via a subband of both ends adjacent to a frequency position at which the SS is transmitted.

Subcarrier spacing of the PSS is wider than subcarrier spacing of the SSS and subcarrier spacing of the PBCH signal may be identical to the subcarrier spacing of the SSS.

The method can further include transmitting, by the transmitting side device, control information to the receiving side device via a plurality of antenna ports (APs). In this case, a plurality of the APs can share and use a DMRS (demodulation reference signal).

The control information is transmitted in a manner of being allocated on the basis of a frequency unit configured by grouping a plurality of frequency resources. The control information transmitted via a different AP can be transmitted using a different frequency unit.

To further achieve these and other advantages and in accordance with the purpose of the present invention, according to a different embodiment, a signal transmission device in a wireless communication system includes a processor configured to set a multiplexed block by multiplexing a PSS (primary synchronization signal), an SSS (secondary synchronization signal), and a PBCH (physical broadcast channel) signal in time frequency domain, wherein the multiplexed block is configured by performing a TDM (time division multiplexing) scheme on the PSS, the SSS, and the PBCH signal, and a transceiver configured to transmit the multiplexed block to a receiving side device.

The PBCH signal is transmitted via a resource of 12 RBs (resource blocks) and an RE (resource element) for transmitting 2 DMRSs can be allocated according to an RB in which the PBCH signal is transmitted.

The processor can configure the PSS and the SSS to have the same bandwidth.

The processor is configured to multiplex the PBCH signal with the SS using the TDM scheme. If the PBCH signal and the SS have the same bandwidth, the processor can control the transceiver to transmit the PBCH signal via a plurality of OFDM symbols.

The processor is configured to multiplex the PBCH signal with the SS using the TDM scheme and the processor can control the transceiver to transmit the PBCH signal via a bandwidth wider than a bandwidth of the SS through 1 OFDM symbol.

The processor is configured to multiplex the PBCH signal with the SS using a FDM scheme and the processor can control the transceiver to transmit the PBCH signal via a subband of both ends adjacent to a frequency position at which the SS is transmitted.

Advantageous Effects

According to the present invention, it is able to efficiently transmit a PBCH signal in a situation in which various requirements exist.

It will be appreciated by persons skilled in the art that the effects that could be achieved with the present disclosure are not limited to what has been particularly described hereinabove and the above and other effects that the present disclosure could achieve will be more clearly understood from the following detailed description.

DESCRIPTION OF DRAWINGS

FIGS. 7 and 8 are diagrams illustrating an example of transmitting control channel information in case of using 4 antenna ports per unit according to one embodiment of the present invention;

FIGS. 9 and 10 are diagrams illustrating an example of transmitting a discovery RS using 4 antenna ports per unit according to one embodiment of the present invention;

FIGS. 11 and 12 are diagrams illustrating an example of transmitting control channel information in case of using 2 antenna ports per unit according to a different embodiment of the present invention and FIGS. 13 and 14 are diagrams illustrating an example of transmitting a discovery RS in the same situation.

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As mentioned in the foregoing description, one embodiment of the present invention proposes a method of efficiently transmitting a signal required for performing initial access in various environments of an NR system. To this end, first of all, a PSS, an SSS, and a PBCH are explained in detail.

Figure 1:
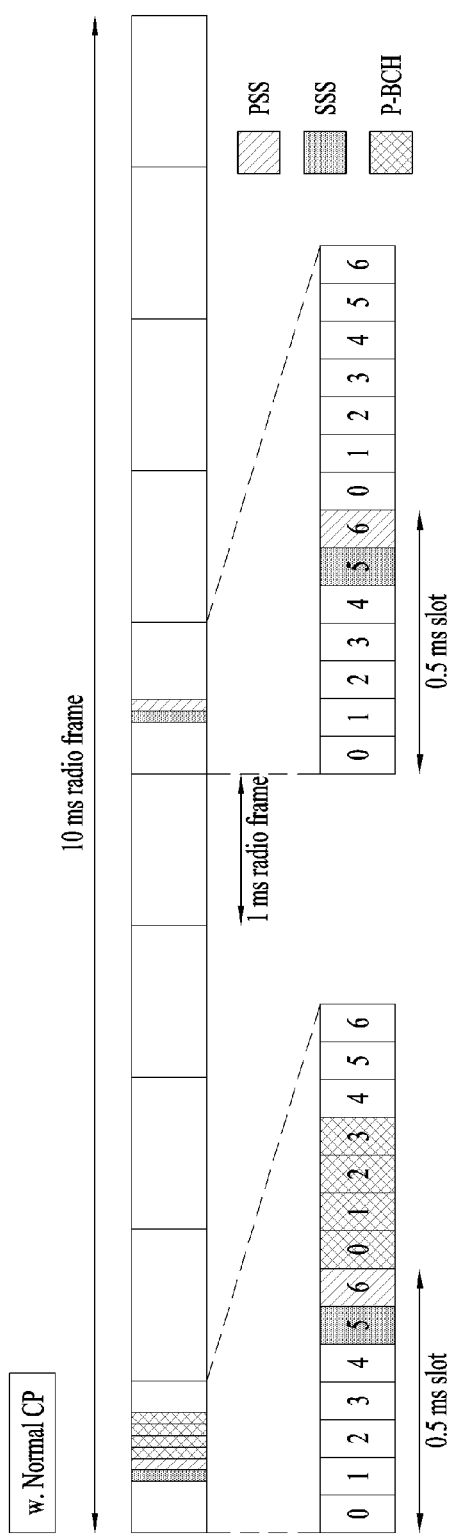
FIGS. 1 and 2 are diagrams for explaining a method of transmitting a synchronization signal and a broadcast channel signal in case of using a normal CP and an extended CP, respectively.
Figure 2:
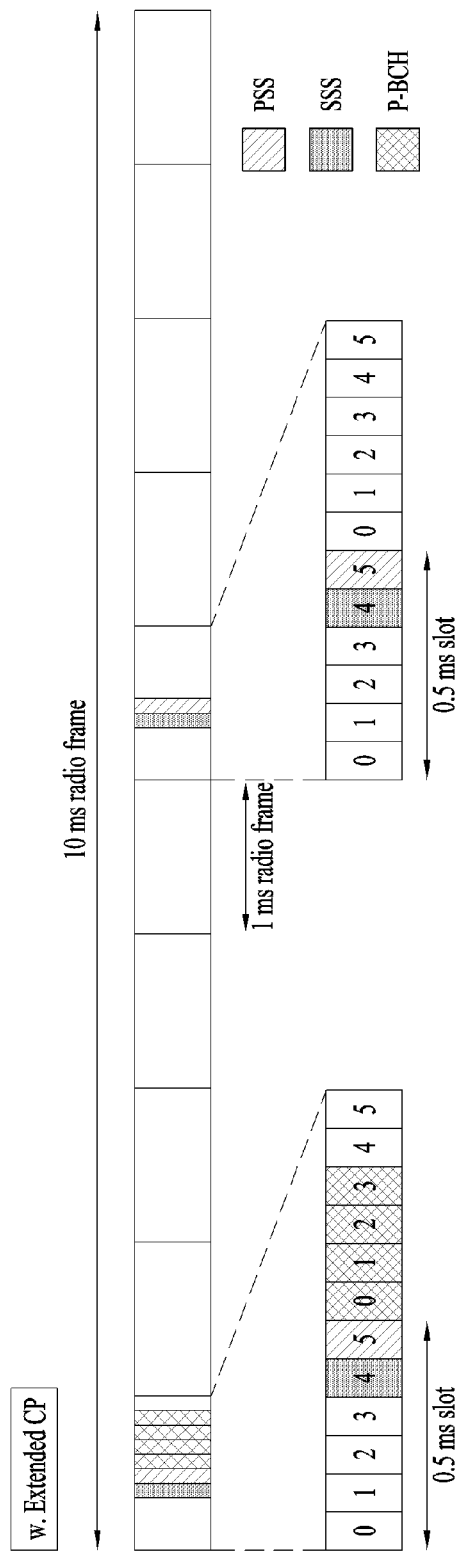

FIGS. 1 and 2 are diagrams for explaining a method of transmitting a synchronization signal and a broadcast channel signal in case of using a normal CP and an extended CP, respectively.

An SS consists of a PSS and an SSS and corresponds to a signal for performing cell search. In case of using a normal CP and an extended CP, FIG. 1 and FIG. 2 illustrates a frame structure for transmitting an SS and a PBCH. The SS is transmitted in a second slot of a subframe #0 and a second slot of a subframe #5 in consideration of a GSM frame length (i.e., 4.6 ms) for ease of inter-RAT measurement and a boundary of a radio frame can be detected via an SSS. The PSS is transmitted in the last OFDM symbol of a corresponding slot and the SSS is transmitted in an OFDM symbol immediately before the OFDM symbol in which the PSS is transmitted. The SS can transmit 504 physical cell IDs in total via a combination of 3 PSSs and 168 SSSs. The SS and the PBCH are transmitted in the center 6 RBs of a system bandwidth to make a UE detect or decode the SS and the PBCH irrespective of a transmission bandwidth.

A transmission diversity scheme of the SS uses a single antenna port only and is not separately defined in the standard. In particular, the SS can use a single antenna transmission scheme or a transmission scheme transparent to a UE (e.g., PVS, TSTD, and CDD).

In the following, an encoding procedure of a PSS and an SSS is explained.

A PSS code defines a ZC (Zadoff-Chu) sequence of a length of 63 in frequency domain and uses the ZC sequence as a sequence of a PSS. The ZC sequence is defined by equation 1 in the following. A sequence element (n=31) corresponding to a DC subcarrier is punctured. In the equation 1, Nzc corresponds to 63.

$$d_u(n) = e^{-j\frac{\pi u n(n+1)}{N_{ZC}}} \qquad \text{[Equation 1]}$$

Among the center 6 RBs (=72 subcarriers), the remaining 9 subcarriers are always transmitted with a value of 0 and provides easiness in designing a filter for performing synchronization. In order to define 3 PSSs in total, it may use values such as u=25, 29, and 34 in the equation 1. In this case, since the values 29 and 34 have a conjugate symmetry relationship, it may be able to perform two correlations at the same time. In this case, the conjugate symmetry means an equation 2 described in the following. It is able to implement one-shot correlator for the values u=29 and 34 using the conjugate symmetry characteristic. Hence, it is able to reduce the entire calculation amount about 33.3%.

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.} \qquad \text{[Equation 2]}$$

In the following, encoding of an SS is explained.

A sequence used for an SSS performs interleaved concatenation on two m-sequences each of which has a length of 31 and transmits 168 cell group IDs via a combination of the two sequences. An m-sequence corresponding to a sequence of S-SS is robust in frequency-selective environment and can reduce calculation amount using fast m-sequence transform using Fast Hadamard Transform. And, two short codes are used for configuring an S-SS. This has been proposed to reduce calculation amount of a UE.

Figure 3:
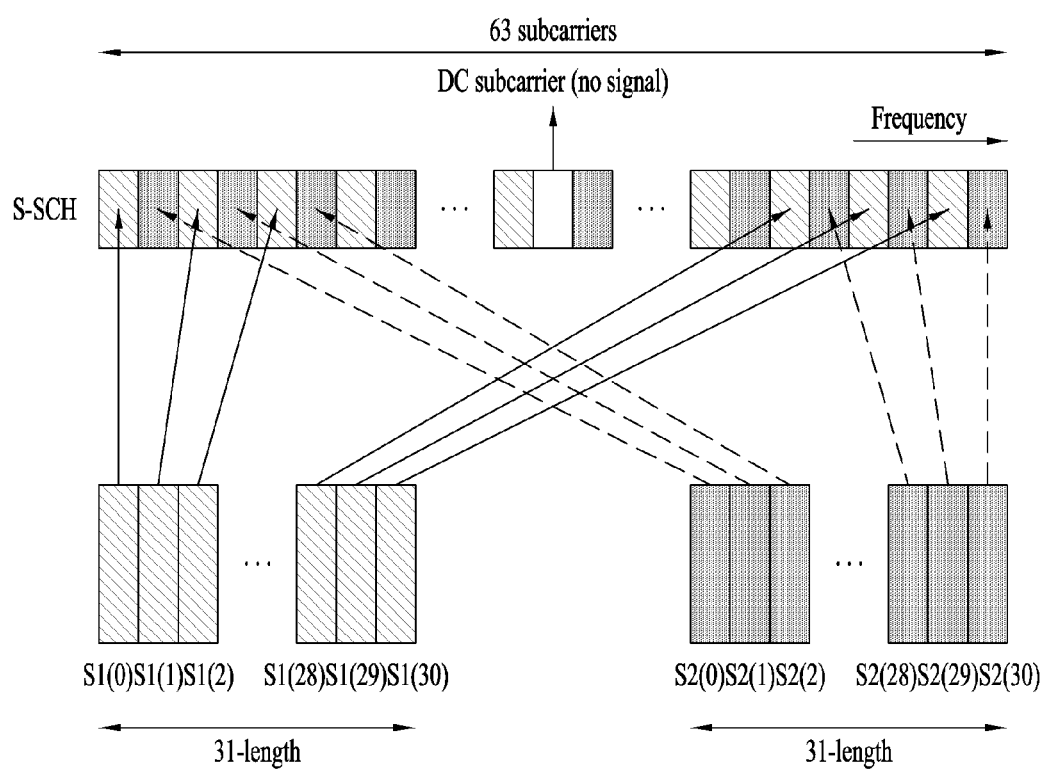
FIG. 3 is a diagram illustrating two sequences of a logical region mapped in a manner of being interleaved in a physical region.

FIG. 3 is a diagram illustrating two sequences of a logical region mapped in a manner of being interleaved in a physical region.

When two m-sequences, which are used for generating an SSS code, are defined as an S1 and an S2, respectively, if an SSS of a subframe #0 transmits a cell group ID via a combination of (S1, S2), an SSS of a subframe #5 transmits a signal by swapping the cell group ID with (S2, S1) to identify 10 ms frame boundary. In this case, the SSS code uses a generator polynomial $x^5+x^2+1$. It is able to generate 31 codes in total via a different circular shift.

In order to improve reception performance, it may define two PSS-based sequences different from each other and scramble the sequences with an SSS. In this case, S1 and S2 can be scrambled with a different sequence. Subsequently, it may define an S1-based scrambling code and perform scrambling on the S2. In this case, a code of the SS is exchanged in a unit of 5 ms. Yet, a PSS-based scrambling code is not exchanged. The PSS-based scrambling code is defined by 6 circular shift versions according to a PSS index in m-sequence generated by a generator polynomial $x^5+x^3+1$. On the other hand, the S1-based scrambling code can be defined by 8 circular shift versions according to an S1 index in m-sequence generated by a generator polynomial $x^5+x^4+x^2+x^1+1$.

Design of NR PBCH

As mentioned in the foregoing description, NR system should consider various conditions. It is able to design the NR system to support coverage similar to the coverage of LTE system and the NR system can be designed in consideration of design direction (e.g., self decoderable, spread over multiple subframes, similar RS overhead) similar to LTE PBCH.

A difference between the NR and the LTE PBCH is in that the NR supports a single-beam operation and a multi-beam operation. It is necessary for the multi-beam operation to consider beam-sweeping. It is preferable to set a limit on the occurrence of the beam-sweeping.

Hence, it is preferable for the NR to assume an MIB (master information block) having the number of information bits less than that of LTE. For example, NR PBCH can be designed as follows under the assumption above.

TABLE 1

MIB bit size: less than 40 bits (e.g. 40 bits = 12 bits (information) + 8 bits
(CRS))
Coded bits: 980 bits (in order to provide similar coverage with LTE)
Channel Coding Scheme: TBCC
Modulation Scheme: QPSK
Occupied Resource Elements (REs): 120REs (= 72 × 2 − 24)
Periodicity: 10 ms
Transmission scheme:
    Option 1: Single antenna transmission scheme
    Option 2: Transmit diversity scheme (e.g. SFBC)
Reference Signal:
    Option 1: Self-contained DMRS
    Option 2: Secondary Synchronization Signal Note:
Assume to use Cell-ID based scrambling FIG. 4 is a diagram for explaining a structure of a PBCH signal according to one embodiment of the present invention.

It may assume that NR PBCH illustrated in Table 1 has 120 REs (resource elements). In particular, it may assume that 24 REs are used for a DMRS among 12 RBs (resource blocks) (i.e., 6 RBs over 2 OFDM symbols) shown in FIG. 4.

Figure 4:
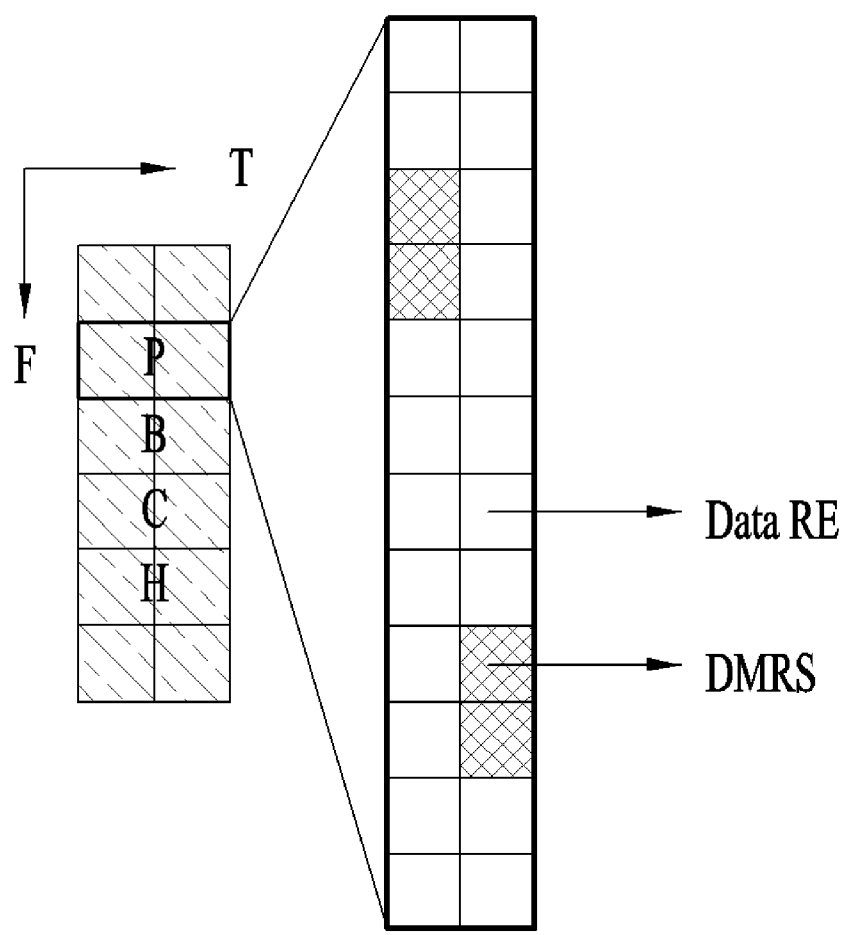
FIG. 4 is a diagram for explaining a structure of a PBCH signal according to one embodiment of the present invention.

As shown in FIG. 4, if two adjacent REs are used for a DMRS, it is able to obtain a transmission diversity gain via RE pairing.

A method of multiplexing NR PBCH with NR-SS is explained under the assumption mentioned above.

Multiplexing of NR-PBCH and NR SS

When a UE performs initial cell access, as mentioned in the foregoing description, it is necessary for the UE to secure a PSS/SSS and a PBCH. In order to efficiently structure the PSS/SSS and the PBCH in an NR system in which various design requirements exist, one embodiment of the present invention assumes that a multiplexed block is configured by multiplexing an NR-SSS, an NR-SSS, and an NR-PBCH. For clarity, the multiplexed block is referred to as an "SS block".

Figure 5:
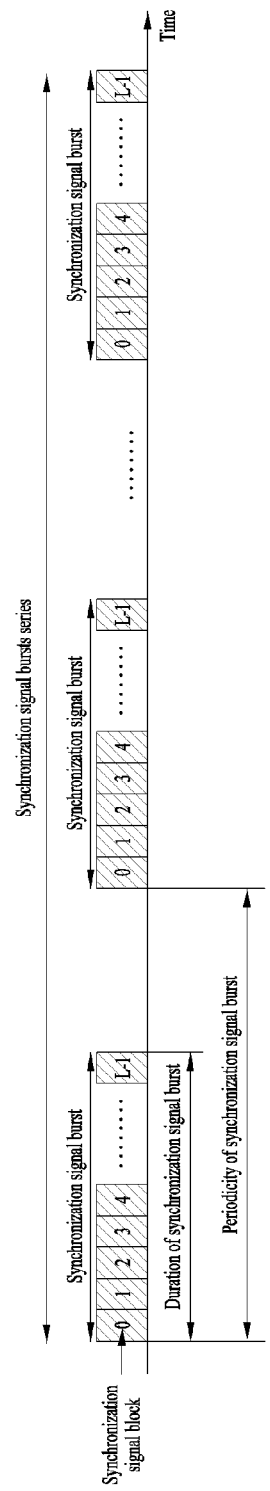
FIG. 5 is a diagram for explaining a concept of an SS block according to one embodiment of the present invention.

FIG. 5 is a diagram for explaining a concept of an SS block according to one embodiment of the present invention.

As mentioned in the foregoing description, the NR-PSS, the NR-SSS, and the NR-PBCH are multiplexed into an SS block to configure a single signal unit. FIG. 5 illustrates a case that "SS burst" is configured by gathering the L number of SS blocks. As shown in FIG. 5, the SS burst can be repeatedly transmitted as many as a prescribed count.

In particular, as shown in FIG. 5, if an NR-PSS, an NR-SSS, and an NR-PBCH are configured as a block or a burst instead of being separately configured, it is able to efficiently perform resource allocation in accordance with various circumstances. In the following description, unless there is a special limit, assume that an NR-PSS, an NR-SSS, and an NR-PBCH are commonly referred to as an SS block. And, unless there is concern of confusion, the NR-PSS, the NR-SSS, and the NR-PBCH are simply called a PSS, an SSS, and a PBCH, respectively.

Figure 6:
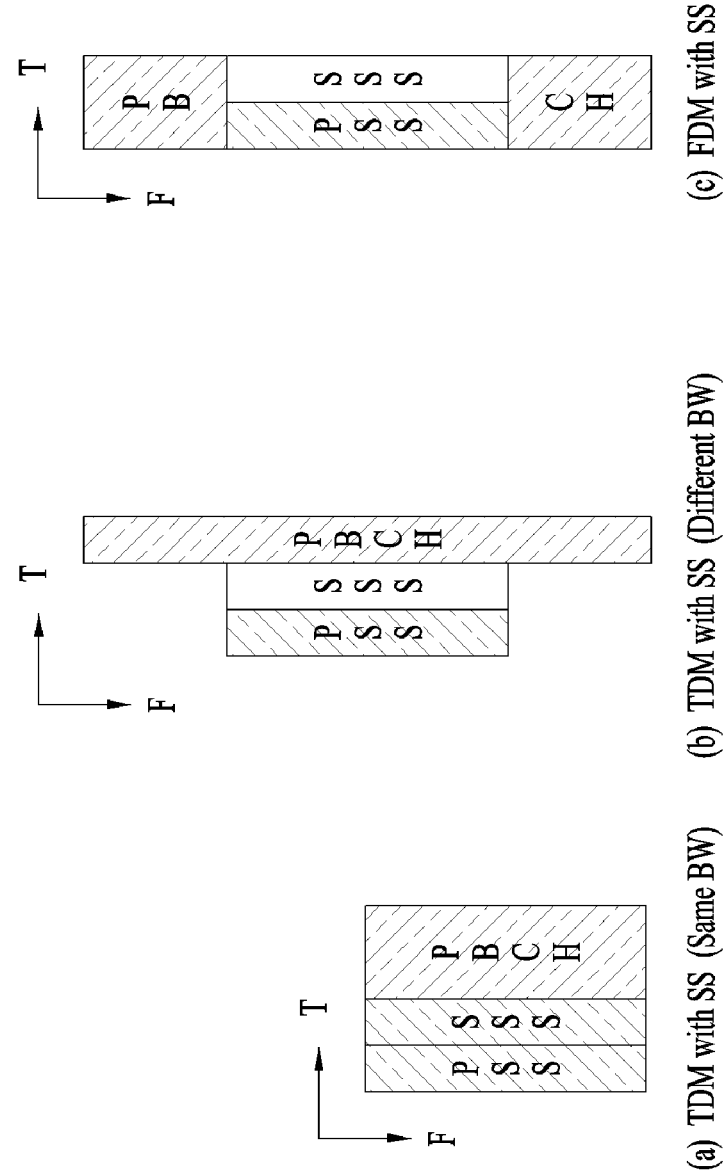
FIG. 6 is a diagram for explaining methods of multiplexing a PBCH with an SS according to embodiments of the present invention.

FIG. 6 is a diagram for explaining methods of multiplexing a PBCH with an SS according to embodiments of the present invention.

As shown in FIG. 6, the present invention proposes to perform TDM on a PSS and an SS within an SS block. If the PSS and the SSS are TDMed, it is able to reduce complexity in time search and have a merit in searching for a fast cell ID compared to a case of performing FDM on the PSS and the SSS. The present invention proposes 3 types shown in FIG. 6.

FIG. 6 (a) illustrates a case that a PBCH and an SS have the same bandwidth while the PBCH and the SS are TDMed. Since the PBCH and the SS have the same bandwidth, it is able to simply search for an SS block in frequency domain. However, since a plurality of OFDM symbols are used for the PBCH, time delay may occur when an SS block is searched.

FIG. 6 (b) illustrates a case that a PBCH has a bandwidth wider than a bandwidth of an SS while the PBCH and the SS are TDMed. Since the PBCH has a wider bandwidth, it is able to have a frequency diversity gain by transmitting the PBCH.

FIG. 6 (c) illustrates a case that a PBCH and an SS are FDMed. Specifically, FIG. 6 (c) illustrates an example of configuring an SS block by dividing the PBCH into both sides of a position to which the SS is mapped in frequency domain.

When an NR system uses a system band equal to or narrower than 6 GHz, subcarrier spacing of 15 kHz or 30 kHz is assumed. In this case, the aforementioned 3 types of SS block configuration do not exceed 5 MHz band.

In order to simplify design, the 3 types of embodiments can be applied to a band equal to or narrower than 40 GHz. In the band equal to or narrower than 40 GHz, if subcarrier spacing of 120 kHz or 240 kHz is used for an SS block, the SS block according to the 3 types of embodiments does not exceed 40 MHz.

As shown in FIG. 4, if a PSS and an SSS have the same bandwidth, the PSS and the SSS are robust to a frequency offset in an initial search stage. Yet, it is advantageous when subcarrier spacing of the PSS is wider than subcarrier spacing of the SSS.

One embodiment of the present invention proposes to configure the subcarrier spacing of the PBCH to be identical to the subcarrier spacing of the SSS to allow the SSS and the PBCH to use the same FFT size.

In the following, a method of transmitting a control signal in NR system is explained under the assumption mentioned above.

Transmission of Control Signal

In NR, if massive MIMO is used, the number of antenna ports may increase as well. In this case, it is necessary to consider a method of obtaining spatial diversity as much as possible and reducing channel estimation performance deterioration by using a plurality of antenna ports. And, when a receiving end is unable to know the number of antenna ports of a transmitting end, a method of detecting the number of antenna ports of the transmitting end capable of being performed without increasing reception complexity is required.

To this end, when a control channel is transmitted using a plurality of antennas in a single OFDM, if two or more antenna ports are used to transmit the control channel, one embodiment of the present invention assumes spatial diversity transmission. When a demodulation reference signal is transmitted, one embodiment of the present invention proposes that the M number of antenna ports share the resource. The spatial diversity transmission is performed in the N number of frequency resource pairs near (OCC or FDM) demodulation RS.

When the N numbers of frequency pairs near the DMRS resource, which is shared by the M number of antenna ports, are defined as a unit, each unit is multiplexed in a frequency unit. Antenna ports different from each other are in charge of transmission between units adjacent to each other. When a receiving end performs data demodulation, the receiving end estimates a channel using a DMRS included in a unit and restores data from an adjacent frequency resource pair.

If the number of antenna ports included in a unit is less than the number of antenna ports of a transmitting end, a signal is transmitted using a different antenna port between units adjacent to each other. If the number of antenna ports included in a unit is identical to the number of antenna ports of a transmitting end, a signal is transmitted using the same antenna ports between units adjacent to each other. If the number of antenna ports included in a unit is greater than the number of antenna ports of a transmitting end, a signal is transmitted using a partial resource corresponding to the number of antenna ports of the transmitting end among DMRS resources included in the unit and transmission is performed using the same antenna port between units adjacent to each other. A receiving end assumes that a signal is transmitted using a different antenna port between units.

Figure 7:
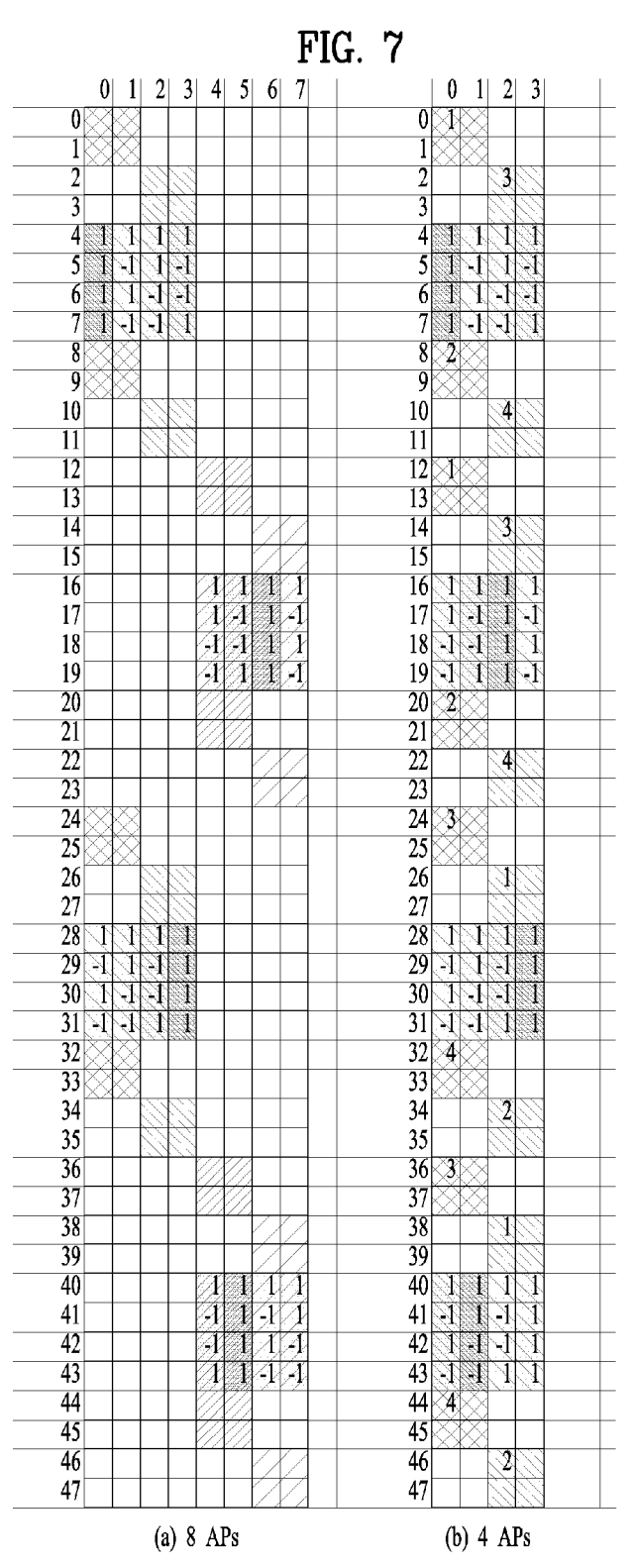
Figure 8:
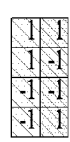

FIGS. 7 and 8 are diagrams illustrating an example of transmitting control channel information in case of using 4 antenna ports (AP) per unit according to one embodiment of the present invention.

An OCC is applied to a DMRS included in a unit in frequency domain. When antenna ports included in a unit are repeatedly used in frequency axis, an OCC value applied to each port is changed. For example, it may be able to cyclically select an OCC according to a port. By doing so, it is able to prevent PAPR of an OFDM symbol from being increased.

A control channel demodulation reference signal is used as an RRM measurement RS, a CSI measurement RS, or a TRP discovery RS. And, a TRP discovery RS and a control channel DMRS are configured by the same pattern.

A transmission period of a TRP discovery RS and a transmission period of a control channel can be differently configured. If transmissions are overlapped, a part of the TRP discovery RS is used as a DMRS of the control channel.

As shown in FIGS. 7 and 8, when a unit is configured in a unit of 4 antenna ports, OCC-4 is applied and a sequence is mapped using 4 consecutive REs.

If a unit is configured in a unit of 4 antenna ports, as shown in FIG. 7, SFBC transmission is performed using 2 antenna ports. And, SFBC transmission is performed in a different adjacent resource pair using another 2 antenna ports. In the present embodiment, a resource pair using a different antenna can be used in an adjacent frequency resource. Specifically, in FIGS. 7 and 8, signals represented by a different hatching correspond to resources using a different antenna.

In the present embodiment, a unit uses 12 REs. 4 REs positioned at the center are used as a DMRS and 8 REs near the DMRS are used for transmitting a control signal. SFBC is performed using a pair of 2 REs and a signal is transmitted using a different antenna in a different adjacent resource pair. A resource can be scalably extended.

It may perform FDM on control channels having a different usage. As an example of a resource having a different usage, there are a PBCH and a common control channel (a grant for paging, RAR, and SIB1/2 or a channel including a triggering message). The PBCH is located at the center of an available frequency resource and the common control channel can be distributed into both ends of the frequency resource.

Figure 9:
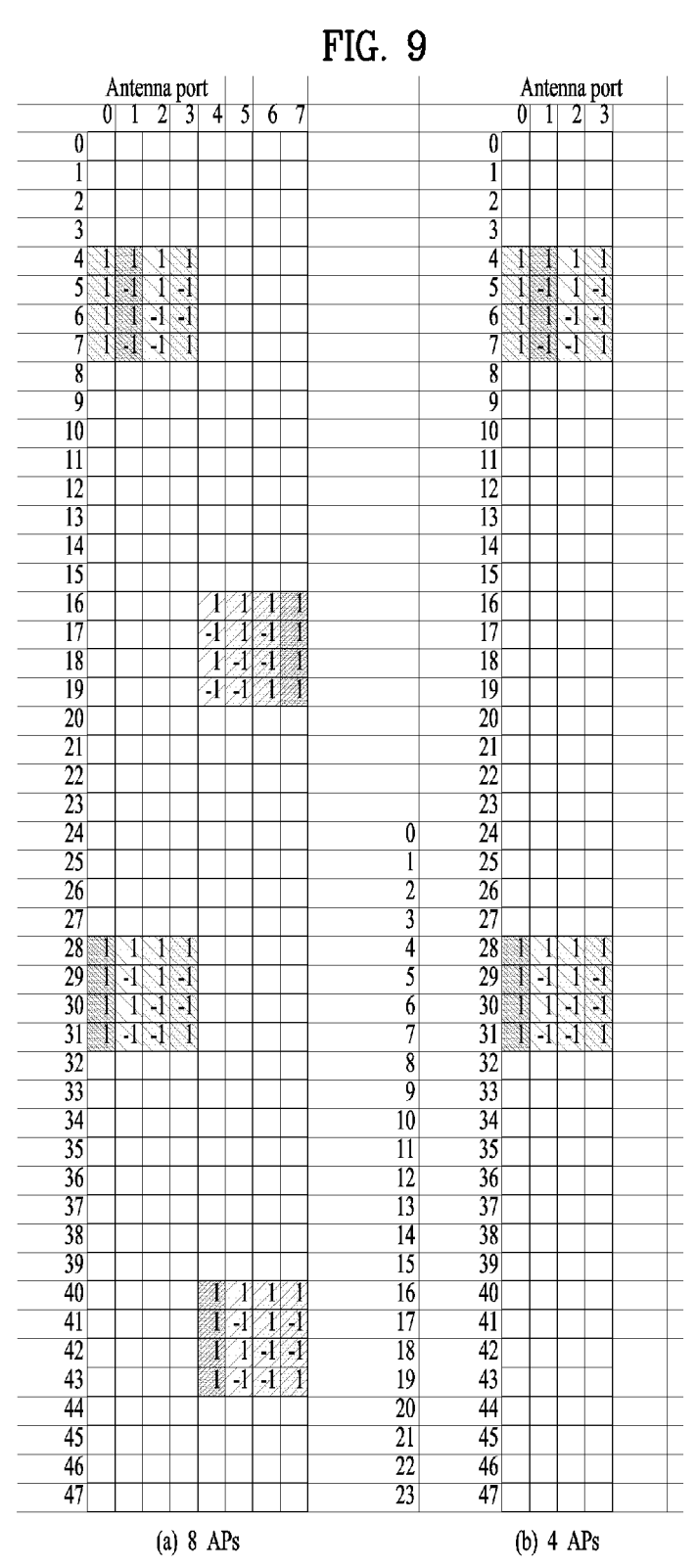
Figure 10:
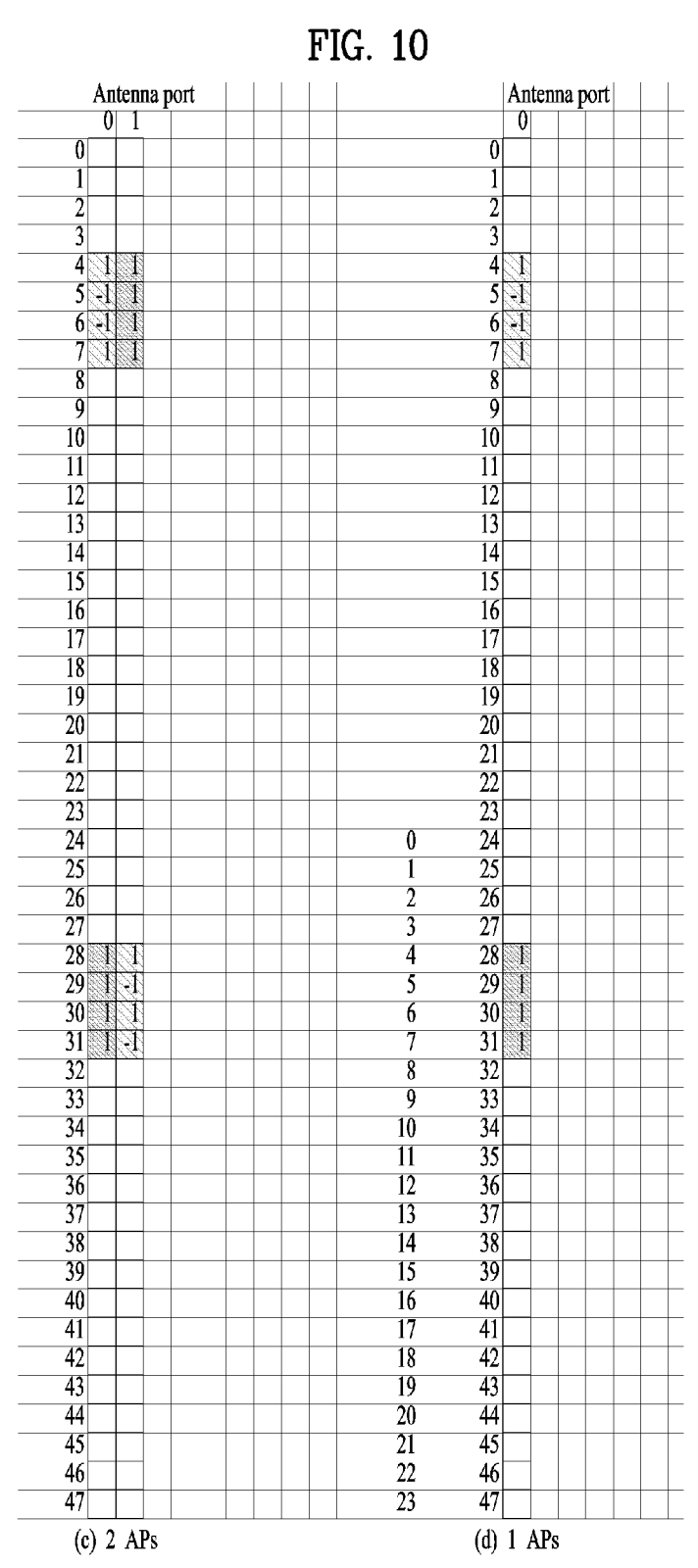

FIGS. 9 and 10 are diagrams illustrating an example of transmitting a discovery RS using 4 antenna ports per unit according to one embodiment of the present invention.

As mentioned in the foregoing description, a control channel demodulation reference signal can be used as an RRM measurement RS, a CSI measurement RS, or a TRP discovery RS. And, a TRP discovery RS and a control channel DMRS can be configured by the same pattern.

A discovery RS shown in FIGS. 9 and 10 can be transmitted with a form identical to a form of a DMRS shown in FIGS. 7 and 8.

Figure 11:
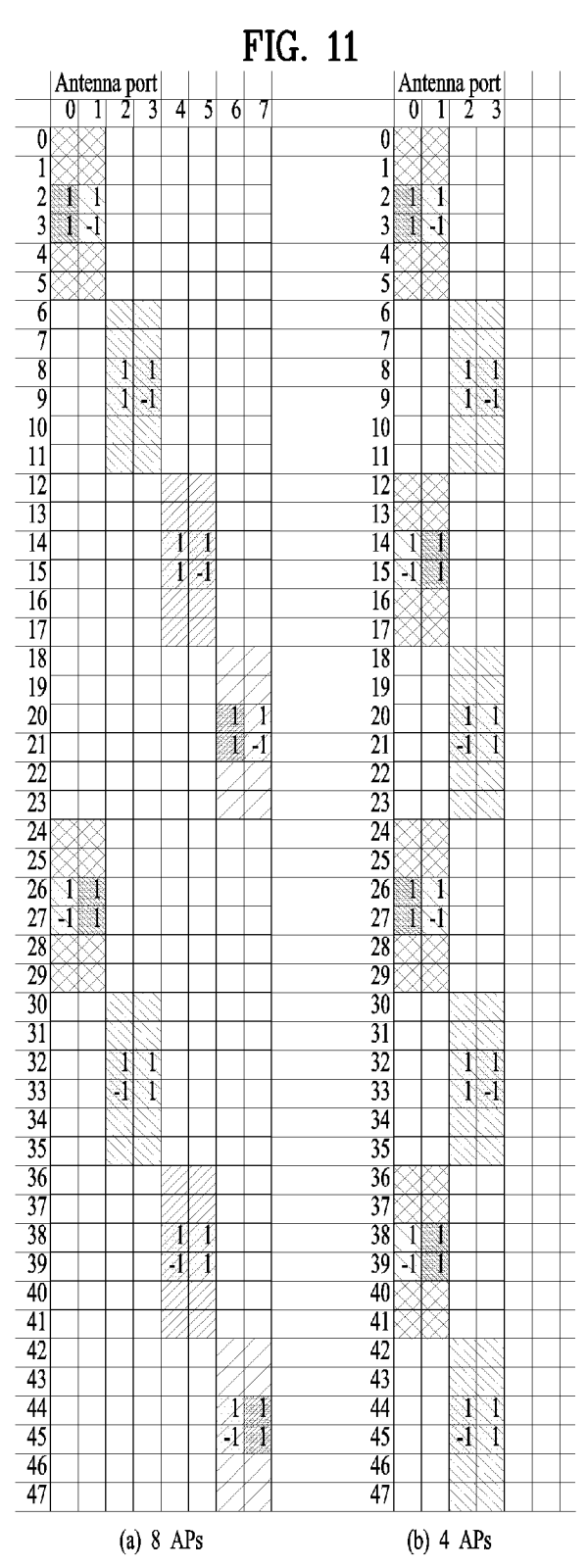
Figure 12:
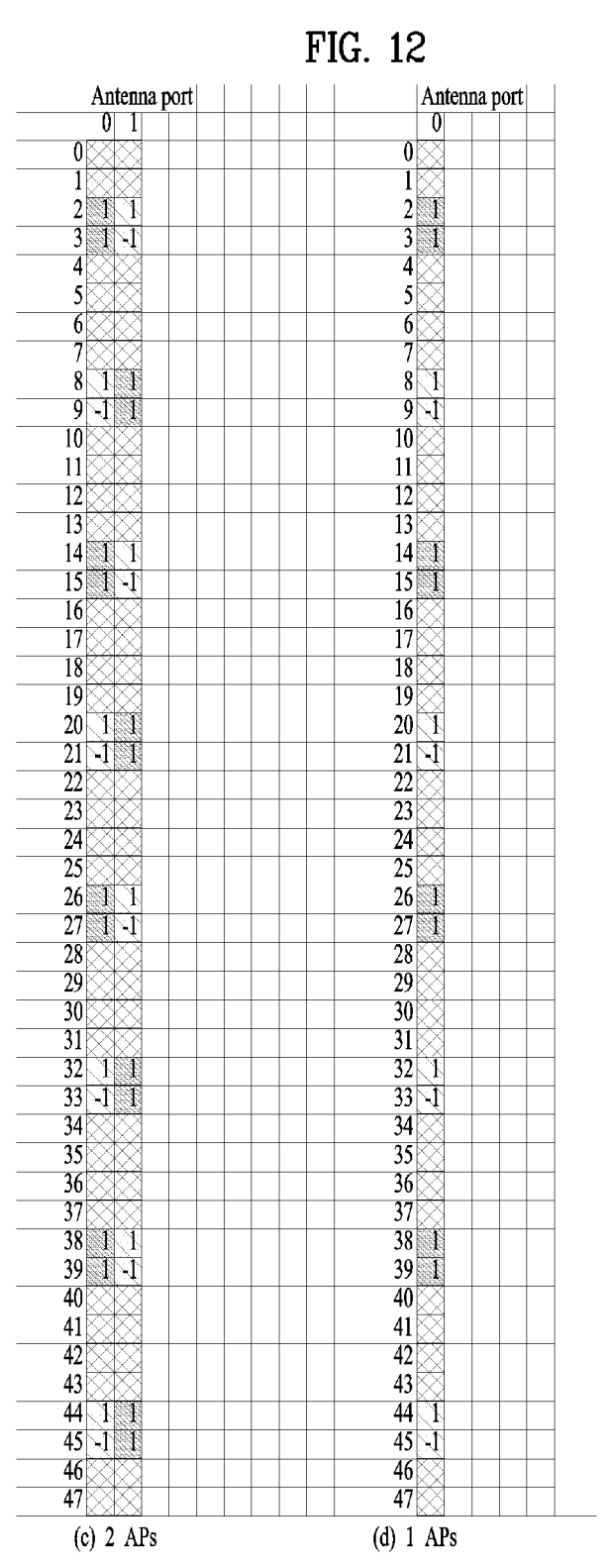
Figure 13:
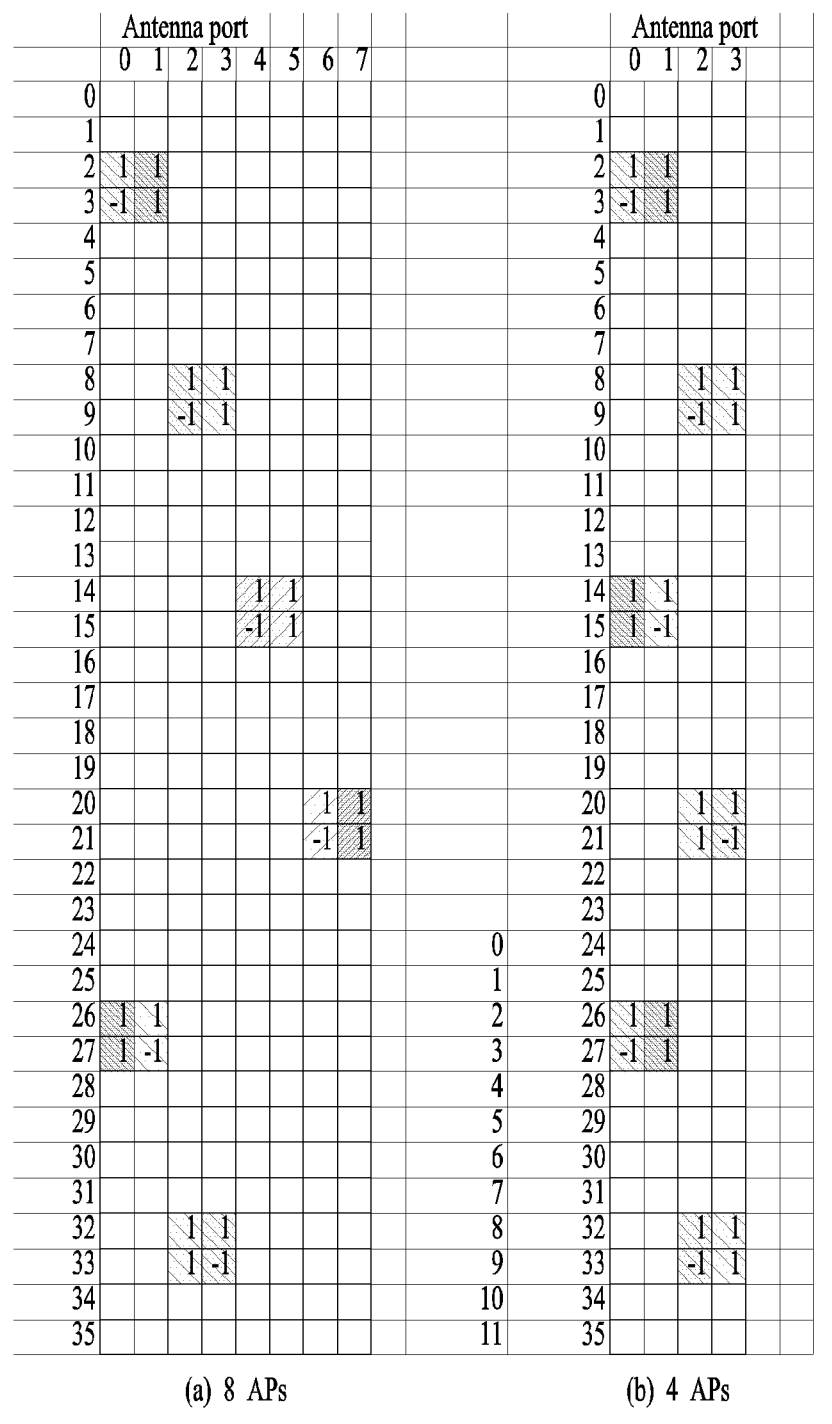
Figure 14:
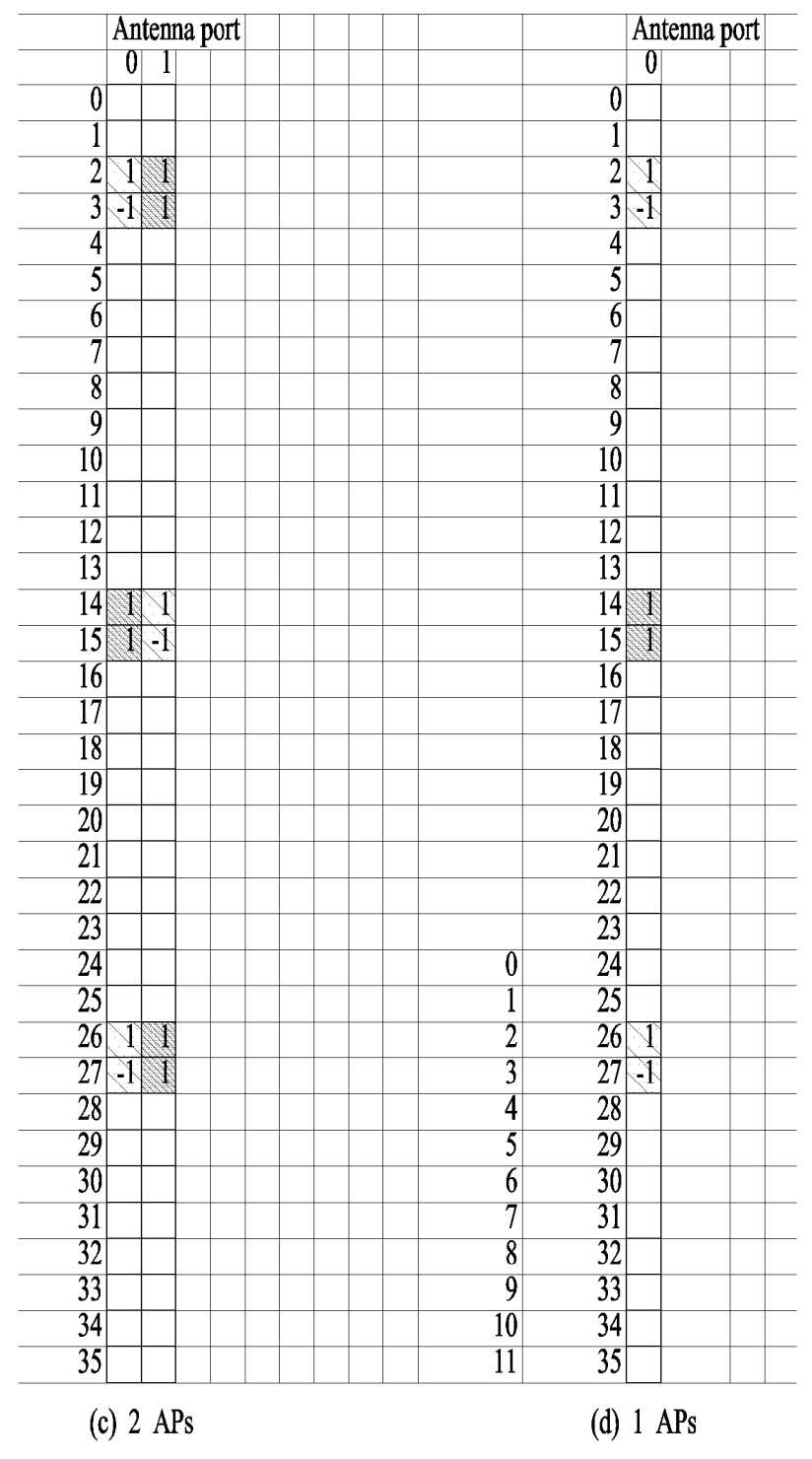

FIGS. 11 and 12 are diagrams illustrating an example of transmitting control channel information in case of using 2 antenna ports per unit according to a different embodiment of the present invention and FIGS. 13 and 14 are diagrams illustrating an example of transmitting a discovery RS in the same situation.

When a unit is configured in a unit of 2 antenna ports, OCC-2 is applied and a sequence is mapped using 2 consecutive REs. When a unit is configured in a unit of 2 antenna ports, SFBC transmission is performed using 2 antenna ports. This configuration can be utilized for single antenna transmission as well.

In the present embodiment, a unit uses 6 REs. 2 REs positioned at the center are used as a DMRS and 4 REs near the DMRS are used for transmitting a control signal. SFBC is performed using a pair of 2 REs. A resource can be scalably extended.

Figure 15:
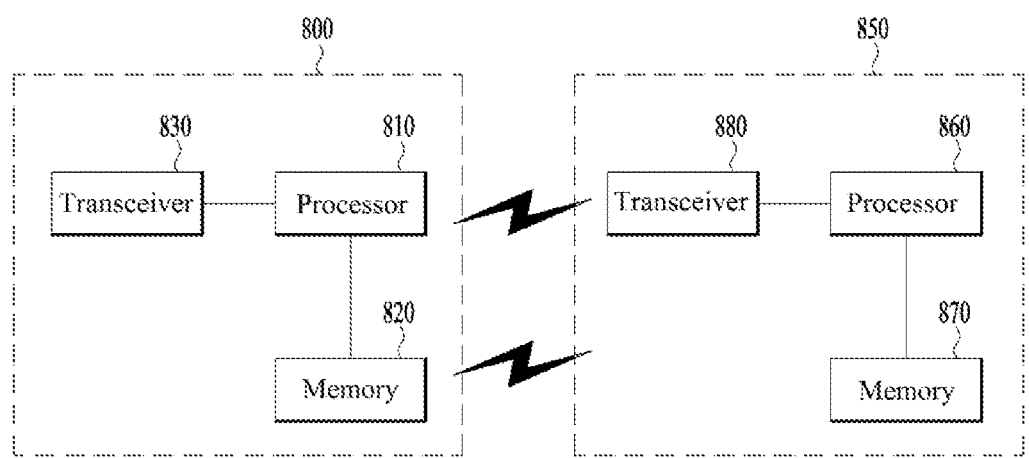
FIG. 15 is a diagram for explaining a device for performing abovementioned operations.

FIG. 15 is a diagram for explaining a device for performing abovementioned operations.

In FIG. 15, a wireless device 800 corresponds to a specific UE in the foregoing description and a wireless device 850 may correspond to a base station or an eNB.

The UE can include a processor 810, a memory 820, and a transceiver 830 and the eNB 850 can include a processor 860, a memory 870, and a transceiver 880. The transceiver 830/880 transmits/receives a radio signal and can be executed in a physical layer. The processor 810/860 is executed in a physical layer and/or a MAC layer and is connected with the transceiver 830/880. The processor 810/860 can perform a procedure of transmitting the aforementioned SS block.

The processor 810/860 and/or the transceiver 830/880 can include an application-specific integrated circuit (ASIC), a different chipset, a logical circuit, and/or a data processor. The memory 820/870 can include a ROM (read-only memory), a RAM (random access memory), a flash memory, a memory card, a storing media and/or a different storing unit. When one embodiment is executed by software, the aforementioned method can be executed by a module (e.g., process, function) performing the aforementioned function. The module can be stored in the memory 820/870 and can be executed by the processor 810/860. The memory 820/870 can be deployed to the inside or outside of the processor 810/860 an can be connected with the processor 810/860 by a well-known medium.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention.

INDUSTRIAL APPLICABILITY

The present invention can be applied not only to the NR system but also to a different wireless system in which various requirements exist.

What is claimed is:

1. A method for a transmitting side device to transmit a signal in a wireless communication system, the method comprising:
configuring multiple multiplexed blocks by multiplexing a PSS (primary synchronization signal), an SSS (secondary synchronization signal), a PBCH (physical broadcast channel) signal, and a DMRS (Demodulation Reference Signal) for the PBCH signal in a time frequency domain for each of the multiple multiplexed blocks,
wherein, based on the PBCH signal being multiplexed with the PSS and the SSS in a TDM (Time Divisional Multiplexing) scheme on different OFDM symbols, the PBCH signal is transmitted through wider bandwidth compared to a bandwidth for transmitting the PSS and the SSS,
wherein, based on the PBCH signal being multiplexed with the SSS in a FDM (Frequency Divisional Multiplexing) scheme on a same OFDM symbol, the PBCH signal is transmitted through frequency bands at both ends and not overlapping with a frequency position at which the SSS is transmitted while the PSS and the SSS are multiplexed in the TDM scheme, and
wherein the DMRS is multiplexed within a time frequency domain for transmitting the PBCH signal;
transmitting the multiple multiplexed blocks through a beam-sweeping operation,
wherein a first subcarrier spacing of the PBCH signal is identical to a second subcarrier spacing of the SSS, and
wherein a third subcarrier spacing of the PSS is wider than the second subcarrier spacing.

2. The method of claim 1, wherein the PSS and the SSS have a same bandwidth.

3. The method of claim 2, wherein the PBCH signal is transmitted through multiple OFDM symbols.

4. The method of claim 1, wherein a given time duration for transmitting the multiple multiplexed blocks is repeatedly configured.

5. A signal transmission device in a wireless communication system, the device comprising:
a transceiver; and
a processor, operatively connected to the transceiver,
wherein the processor is configured to set multiple multiplexed blocks by multiplexing a PSS (primary synchronization signal), an SSS (secondary synchronization signal), a PBCH (physical broadcast channel) signal, and a DMRS (Demodulation Reference Signal) for the PBCH signal in a time frequency domain for each of the multiple multiplexed blocks,
wherein, based on the processor multiplexing the PBCH signal with the PSS and the SSS in a TDM (Time Divisional Multiplexing) scheme on different OFDM symbols, the processor controls the transceiver to transmit the PBCH signal through wider bandwidth compared to a bandwidth for transmitting the PSS and the SSS, and
wherein, based on the processor multiplexing the PBCH signal with the SSS in a FDM (Frequency Divisional Multiplexing) scheme on a same OFDM symbol, the processor controls the transceiver to transmit the PBCH signal through frequency bands at both ends and not overlapping with a frequency position at which the SSS is transmitted while the processor multiplexes the PSS and the SSS in the TDM scheme,
wherein the processor multiplexes the DMRS within a time frequency domain for transmitting the PBCH;
wherein the processor further controls the transceiver to transmit the multiple multiplexed blocks through a beam-sweeping operation,
wherein a first subcarrier spacing of the PBCH signal is same as a second subcarrier spacing of the SSS, and
wherein a third subcarrier spacing of the PSS is wider than the second subcarrier spacing.

6. The device of claim 5, wherein the processor configures the PSS and the SSS to have a same bandwidth.

7. The device of claim 6, wherein the processor is configured to control the transceiver to transmit the PBCH signal via a plurality of OFDM symbols.

* * * * *